United States Patent [19]

Girod et al.

[11] Patent Number: 4,965,442

[45] Date of Patent: Oct. 23, 1990

[54] SYSTEM FOR ASCERTAINING DIRECTION OF BLUR IN A RANGE-FROM-DEFOCUS CAMERA

[75] Inventors: Bernd Girod, Boston; Edward H. Adelson, Cambridge, both of Mass.

[73] Assignee: Massachusetts Institute of Technology, Cambridge, Mass.

[21] Appl. No.: 433,577

[22] Filed: Nov. 7, 1989

[51] Int. Cl.$^5$ .................................................. G01J 1/20
[52] U.S. Cl. .................................. 250/201.7; 356/376; 382/1
[58] Field of Search ............... 250/201.6, 201.7, 201.4; 356/376, 371; 382/1, 32

[56] References Cited

U.S. PATENT DOCUMENTS

| | | | |
|---|---|---|---|
| 4,629,324 | 12/1986 | Stern | 356/376 |
| 4,653,104 | 3/1987 | Tamura | 356/376 |
| 4,825,263 | 4/1989 | Desjardins et al. | 356/376 |

*Primary Examiner*—David C. Nelms
*Assistant Examiner*—George Beck
*Attorney, Agent, or Firm*—Robert K. Tendler

[57] ABSTRACT

A range camera is provided for the determination of range to an object through the utilization of a system which projects a limited depth of field light pattern onto an object and measures the blurring of the pattern on the object. In one embodiment an anisotropic aperture or astigmatic optics are used in combination with an isotropic pattern to eliminate system error introduced by the camera. The anisotropic aperture provides that blurring takes place only in a given direction, with measurement of blurring in an orthogonal direction providing an output only responsive to the blurring associated with the camera. This blurring can then be subtracted out to eliminate system error from the range measurement. The range camera is operative to produce a range picture or map, with optional outputs providing localized albedo and a conventional brightness image. In another embodiment, the direction of the blur, either in front of or in back of the plane of best focus of the projected pattern, is provided through the utilization of a mask having an aperture devoid of point symmetry. In a further embodiment, direction of blur can be ascertained through the utilization of astigmatic optics.

8 Claims, 8 Drawing Sheets

SYSTEM FOR ASCERTAINING DIRECTION OF BLUR IN A RANGE-FROM-DEFOCUS CAMERA

FIELD OF THE INVENTION

This invention relates to the measurement of range from the defocus of an image and more particularly to a range camera utilizing structured light projected onto the image, with the range being determined by the extent of blurring of the structured light pattern on the image.

BACKGROUND OF THE INVENTION

Ranging techniques exist which utilize triangulation or stereoscopic viewing of an object to ascertain the range of the object. It will appreciated that in stereoscopic or triangulation systems, the object is viewed from two distinct positions from which data the range to various points on the object can be ascertained. Because of the observation of the object from two distinct locations, the consequent stereopsis is plagued with several problems.

The first problem is the so-called "missing parts" Problem in which all parts of the scene are not visible at both viewing locations. This results in "holes" in the range image due to the occlusion or shadowing effect in which parts of the scene are in front of and occlude other parts of the scene. When viewed from different angles required by triangulation or stereo techniques, there are thus various parts of the scene for which no data can be obtained.

Additionally when periodic structured light patterns, e.g. lines or grids, are used, the system which is detecting the range of various localized portions of the scene can be confused as to which parts of the pattern the camera is looking at. This confusion leads to erroneous range measurements. Note the uncertainty is due to the spatial separation between the points at which the object is viewed.

Triangulation type techniques have been described by the following investigators in the indicated publications: R. A. Jarvis, "A Perspective on Range Finding Techniques for Computer Vision," IEEE Trans. on Patt. Anal. and Mach. Intell., vol PAMI-5, no. 2, 122-139, March 1983; K. S. Fu, R. C. Gonzales, C. S. G. Lee, "Robotics: Control, Sensing, Vision, and Intelligence," McGraw-Hill, 1987; K. Araki, Y. Sato, S. Parthasarathy, "High Speed Range Finder," SPIE vol. 850, Optics, Illumination, and Image Sensing for Machine Vision II, 184-188, Cambridge, Nov. 1987; K. L. Boyer, A. C. Kak, "Color-Encoded Structured Light for Rapid Active Sensing," IEEE Trans. on Patt. Anal. and Mach. Intell., vol. PAMI-9, no. 1, 14-28, January 1987; W. Frobin, E. Hierholzer, "Rasterstereography: A Photogrammetric Method for Measurement of Body Surfaces," Photogrammetric Engineering and Remote Sensing, vol. 47, no. 12., 1717-1724, Dec. 1981.

In order to solve the above-mentioned problems with stereoscopic or triangulation techniques, obtaining range from the defocus of an object imaged on a camera image plane has been suggested by A. P. Pentland in an article entitled, "A New Sense for Depth of Field," IEEE Trans. on Patt. Anal. and Mach. Intell., vol. PAMI-9, no. 4, 523-531, July 1987.

In this paper a passive system is provided in which an object is viewed by a camera having a wide aperture lens and a narrow aperture lens, with the extent of blur of the object providing for localized measurements of range from the camera to the object. The Pentland system however requires that the object contains high spatial frequency components across the scene in order to be able to measure local blur for each visible point of the scene. What will be apparent from the Pentland system is that the utilization of a passive technique cannot provide for range measurements to objects such as plane walls which do not naturally have high spatial frequency components.

Note, since cameras having wide and narrow aperture lenses are used in the Pentland system, two images are produced that are identical except for depth of field, because change of aperture does not affect the position of the image features. Since differing aperture size causes differing focal gradients, the same point will be focused differently in the two images. Note that the magnitude of this difference is a simple function of the distance between the viewer and imaged point. Here the small depth of field, large aperture optics provides a sharp image baseline from which to measure the blur detected by the large depth of field, small aperture optics.

In summary, in the Pentland system, to obtain an estimate of range, all that is necessary is to compare blur at corresponding points of the two images and measure the change in focus. Because the two images are identical except for aperture size, they may be compared directly. This is because there is no matching problem as there is with stereo or motion algorithms. It is thus possible to recover absolute distance by a comparison of the local blur of the two images.

It will be noted also that none of the range cameras mentioned above can pick up disparities in flat regions of an image, with both the stereo systems and the Pentland system suffering from image dependency, absent the use of structured light. Structured light, as used herein, refers to the projection of a pattern onto an object in which the pattern is one containing high spatial frequency components.

Note other publications relating to range cameras include: M. Subbarao, "Parallel Depth Recovery by Changing Camera Parameters," IEEE 2nd Intern. Conf. on Computer Vision, 149-155, Dec. 1988; T. Darell, K. Wohn, "Pyramid Based Depth from Focus," Proc. IEEE Conf. on Computer Vision and Pattern Recognition '88, 504-509, June 1988; V. M. Bove, Jr., "Synthetic Movies Derived from Multi-Dimensional Image Sensors," Ph.D. thesis, Media Arts and Sciences Section, Mass. Inst. of Techn., 1989.

There are numerous applications for which a range camera can be put. With not only reflected luminescence as a function of position but also range as a function of position, a range camera can be utilized as a major aid in post-production processing in which originally photographed scenes can be altered and/or manipulated both as to spatial orientation and lighting. Range cameras give a new dimension to so-called "blue boarding" in which certain images are made to appear ahead of or behind other images. The ability to obtain three dimensional data through the utilization of a range camera aides in robot vision, image processing, image understanding, graphics, animation, three dimensional television or motion pictures, three dimensional portraits, human face recognition for security purposes, anthropometry, medical applications, visual inspection of parts including optical comparisons, modelization, vehicle guidance, mold fabrication CAD/CAM, automatic assembly, object reproduction including mold reproduction, and certain museum applications. The derivation of three dimensional images or information to produce these images is useful in a variety of research activities, for example integration of multiple views of the same object to form a model; creation of a library of object models to investigate searching algorithms and image description; and development of interactive procedures to measure, manipulate, and edit three dimensional information.

For these and other applications any range camera should have the following properties: The system should provide a sensing process which is relatively fast. The range camera should be able to run at the same rates as an ordinary video camera, at least at 30 frames per second. Moreover the sensing process should be active in the sense of using structured light. Passive viewing of scenes or objects does not achieve the required range content of the entire scene, should the object not have the type of discontinuities or high spatial frequencies required. Thus the system should be capable of achieving a reliable range signal independent of surface texture and illumination. Additionally, laser illumination should be avoided as a light source. In applications which involve range images of people, even if there is no health hazard, there is a considerable psychological barrier to using lasers. It will of course be appreciated that spatial resolution as well as depth resolution of the range image should be as high as possible. Finally the technique should be inexpensive and robust.

SUMMARY OF THE INVENTION

In order to accommodate all of the above considerations, an active depth from defocus system exploits a limited depth of field projected light pattern. The term "active" refers to the projection of a pattern of high spatial frequency onto the object to permit a uniquely accurate and rapid range determination from point to point across the object.

In the subject system, the structured light pattern is projected through a large aperture lens onto the object's surface, with the large lens providing an extremely narrow depth of focus for the projected pattern. Thus the projected image has a very limited depth of field. If the object is exactly at the plane of best focus for the pattern, the Pattern on the object will appear virtually unblurred. As portions of the object are displaced from the plane of best focus, the projected pattern on the object will become blurred in proportion to the distance of the object from this best plane of focus. Blurring as used herein refers to a decrease in sharpness of a projected pattern. Alternatively, blur can be considered to be the convolution of the structured light pattern with the point spread function of a system. Note, that for many applications the projected light pattern can be shifted into the invisible wavelength range, namely the infrared or ultraviolet. For example, it is often times distracting to an individual to have a pattern projected onto his face. Use of an invisible pattern permits the subject range camera to be used in studio applications, video conferencing terminals, or for face recognition systems.

By utilizing a beam splitting mirror, the light source lens is virtually in the same position as the camera lens. This provides a single optical axis for the system which eliminates the "missing parts" problem, as well as any uncertainty as to which parts of the pattern the camera is looking at. Also, as compared to stereo systems, alignment and calibration is greatly facilitated.

The camera lens has a smaller aperture than the projection lens such that the camera depth of field is significantly larger than the light source depth of field. The further the object's surface is behind or in front of the plane of best focus of the structured light source, the more defocused the projected light pattern will be. The camera picks up the structured light pattern and measures its degree of defocusing by digital signal processing techniques in which the extent of blur is measured across the object. Range is then inferred from the degree of defocusing.

There are however certain errors introduced by virtue of the depth of field of the camera itself. On the camera image plane, the structured light pattern appears additionally defocused due to the limited depth field of the camera. Even with small aperture cameras, the system-induced error can be significant. In order to make the active depth from defocus system insensitive to this potential source of systematic error, an isotropic structured light pattern is used in conjunction with an anisotropic light source aperture. By anisotropic is meant that the effective aperture is wider in one direction vis-a-vis an orthogonal direction. Blur of the Projected pattern on the object will thus preferentially occur in the wider or long direction.

In order to measure range, signal processing following the camera compares the blur in two orthogonal directions. Since the blur introduced by the camera optics affects both directions equally, and since measuring the blur in the short or narrow orthogonal direction gives a direct measure of the amount of blur due to camera optics, this camera-induced error can be eliminated through effectively subtracting out blur in the short direction from the blur occurring in the long direction.

More particularly, on the camera image plane, the structured light pattern will appear additionally defocused due to limited depth field of the camera. Further blurring is introduced by the camera target, e.g. by the beam aperture of the pick up CRT. In order to make active depth from defocus system insensitive to these potential sources of systematic error, an isotropic structured light pattern is utilized in conjunction with an anisotropic light source aperture. For instance if the light source aperture is large or wide in the NWSE direction and small or narrow in the NESW direction, if the object surface is not in the plane of best focus, then the structured light pattern will be blurred in the NWSE direction, but not in the NESW direction. In order to measure range, signal processing following the camera compares the blur in each of these two orthogonal directions. Since the blur introduced by the camera optics affects the NESW and NWSE directions equally, and since the blur is only allowed to exist in one direction, blur in a direction orthogonal to this direction is solely that due to the camera. This error can be removed from the blur in the large aperture direction. Utilization of diagonal slits is preferred as opposed to horizontal or vertical apertures in conjunction with a line-scanned CRT because in the scanning process of a video camera, the operation of the camera affects the horizontal and vertical transfer function in different ways. With an isotropic image sensor such as a 2-D CCD array, horizontal or vertical orientation is preferred since they lead to simpler processing.

It will be appreciated that structured light patterns on object surfaces both behind and in front of the plane of best focus will appear blurred, leading to an ambiguity in the range measurement unless the object is known to be entirely behind or in front of the plane of best focus. For practical system operation, the plane of best focus can either be set closer than the closest point, or further than the furthest point in the scene. If infinity is chosen to be in best focus, ambiguity is avoided altogether. The ambiguity of whether an object is behind or in front of the plane of best focus does not occur if a special aperture shape is used.

More particularly, if the mask utilized in the production of the anisotropic aperture has no point symmetry, then the direction of the blur can be ascertained by virtue of the flipping of the blurred image in front of the plane of best focus, whereas the blurred image is not inverted when the object is further away from the plane of best focus.

With a slit aperture, it is sometimes difficult to project enough structured light on to the object's surface. Alternatively an astigmatic optical system may be utilized for the light source such that two distinct planes of best focus for horizontal and vertical structures are obtained. Such a lens system can be built by combining a conventional non-astigmatic lens with a cylindrical lens. The objects surface could for example be between these two planes of best focus. Then a change in distance would for example defocus for any horizontal structures, while increasing focus for vertical structures, or vice versa.

It will be appreciated that the plane of best focus in one direction will be at one position along the optical axis of the camera, whereas the plane for the orthogonal best focus will be at another position.

Additionally, it is possible to build an active depth from defocus range camera that simultaneously yields a conventional low resolution brightness image due to ambient lighting. This can be accomplished by using a high frequency structured light pattern which can be removed from the camera video signal by linear filtering. Note that the scene geometry has no effect on the structured light frequency on the camera target, since light source and camera are virtually at the same point.

It will be noted that with the subject system, moving range pictures are obtained at full video frame rate. In addition to range sensing, this system can deliver a conventional brightness image and simultaneously measure surface reflectivity or albedo on a point by point basis. Also by combining the depth estimate with the intensity of the light reflected from the object's surface, one can directly measure the surface albedo.

In summary, an active depth from defocus system]is provided that exploits the limited depth of field projected light pattern. It combines the advantages of passive depth from defocus systems insofar as eliminating correspondence and missing parts problems, with the advantages of active structured light techniques which are almost independent of surface features. Range pictures are obtained at full video frame rate.

BRIEF DESCRIPTION OF DRAWINGS

These and other features of Subject Invention will& be better understood in conjunction with the Detailed Description taken in conjunction with the Drawings of which.

DETAILED DESCRIPTION

Figure 1A:
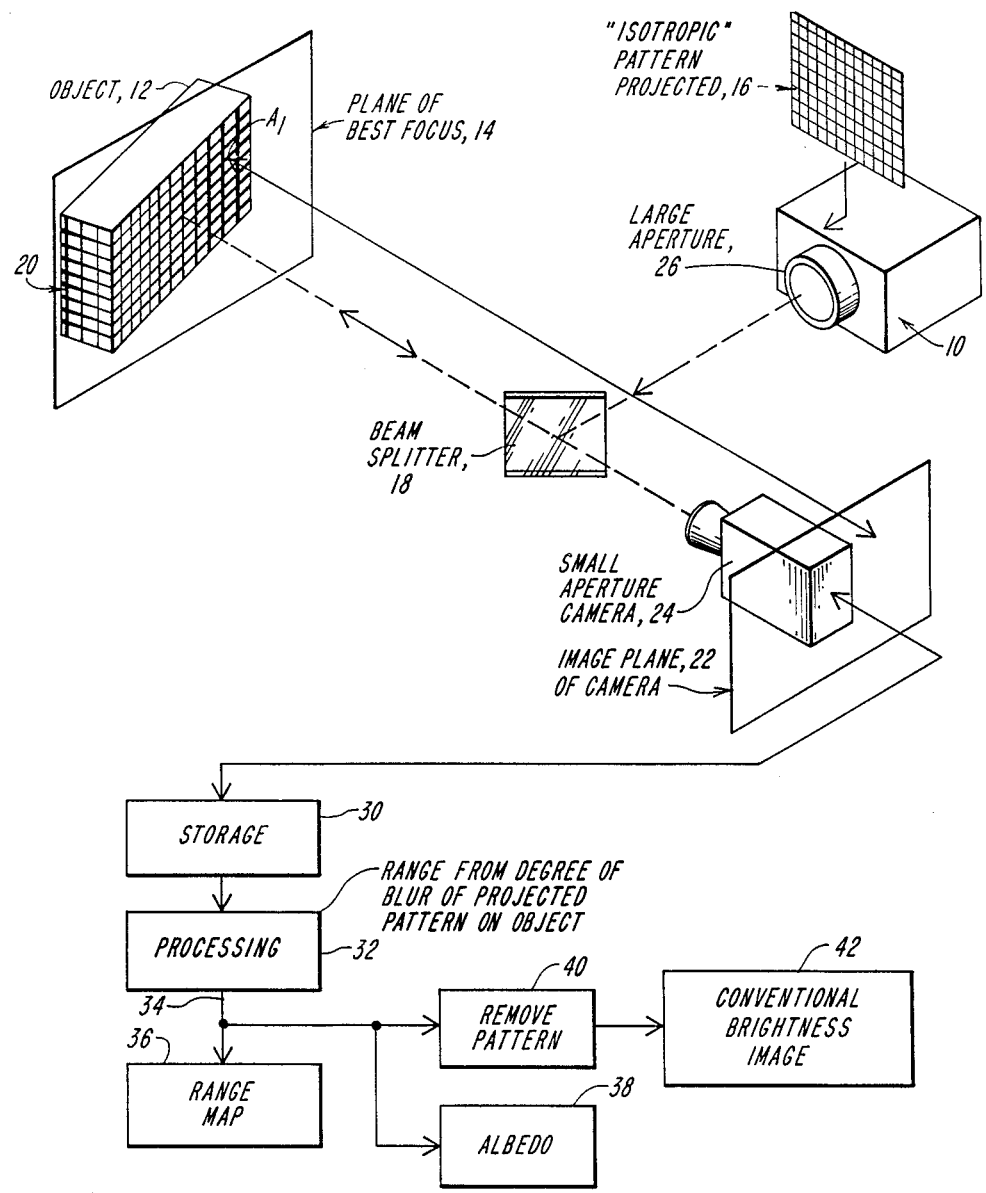
FIG. 1A is a diagrammatic and block diagram of the subject system, illustrating the projection of the limited depth of field light pattern onto a rectilinear object displaced in back of the plane of best focus of the projected image.

Referring now to FIG. 1A in one embodiment, the subject range camera includes a source 10 for the "isotropic" pattern of high spatial frequency light and dark areas to be projected onto an object 12. The object is located, as illustrated, behind the plane of best focus 14 of the projected pattern. The term isotropic as used herein means that the pattern has the same physical properties in all measurement directions. Here it can be seen that the projected pattern is an optically projected rectilinear grid 16 which, when projected via beam splitter 18 onto object 12 causes the pattern, here illustrated at 20 to be blurred the further the particular surface patch, $A_1$, is from the plane of best focus 14. The distance or range D of this area from the image plane 22 of a camera 24 is that which is measured by the subject system, with D being composed of the distance between planes 14 and 22, plus the distance of the surface patch under investigation from plane 14. It will be appreciated that the optics 26 associated with pattern projector 10 are large aperture objects, thereby to establish that the depth of field of the projected pattern about the plane of best focus is in fact limited.

On the other hand the aperture of camera 24 is made quite small such that the effects of depth of focus of the camera will not significantly alter the measurements.

As can be seen, the output of camera 24 is coupled to a storage device or medium 30 which, when read out to processing unit 32 provides as an output on line 34, the range or distance as a degree of blur or defocus of the projected pattern on the object. Thus for any given area on the object surface, hereinafter called a surface patch, the range or distance of this area to the image plane of the camera is available so as to permit production of a range map at display 36.

It is the patch by patch development of range or distance which permits manipulation of the image for the purposes and reasons described hereinbefore.

Additionally the information from processing unit 32 may be utilized to define the albedo 38 of each of the surface patches and, with either electronic or optical removal of the Projected pattern by filter 40, results in a conventional brightness image 42.

Measurement of albedo given reflected light intensity and range is provided by unit 28. Note that albedo is related to light intensity by the following formula:

$$\text{Intensity} = K*r*\cos(B)/(D*D) \quad (1)$$

where K is a normalizing constant, B is the angle of incidence, r is albedo, and D is distance. Obviously, one needs K, B and D to compute r from intensity.

The data measured by a range camera provides D directly. The constant K is a system parameter, and can be calculated using a test object of known albedo. The angle of incidence, B, which is the angle between the structured light rays and the normal vector of the object surface, is obtained by considering the spatial gradient of the range picture D(x,y). In more detail, B is calculated by calculating differences between horizontally adjacent range measurements as well as vertically adjacent range measurements. The horizontal and vertical differences together form a two-dimensional vector, referred to as the spatial gradient vector of the range picture. The absolute value, or length of the gradient vector, properly normalized, is the tangent of the angle of incidence B. Thus, B can be determined from the local variation of the range picture D. Once B and D are known together with the light intensity reflected by the object surface due to the structured light pattern, the albedo of the object surface can be calculated as well.

As to the generation of a conventional brightness image, the high spatial frequencies of the image are removed by a low pass filter. Because the projected pattern is to have high spatial frequency components, the pattern is removed, leaving a low resolution conventional brightness image which may be displayed conventionally at 42. The low pass filtering may be accomplished electronically with digital image processing algorithms or may be performed optically with optical low pass filters. It will be appreciated that the process for forming conventional brightness images by low pass filtering can be aided by using a structured light pattern that does not contain low frequency components.

Figure 1B:
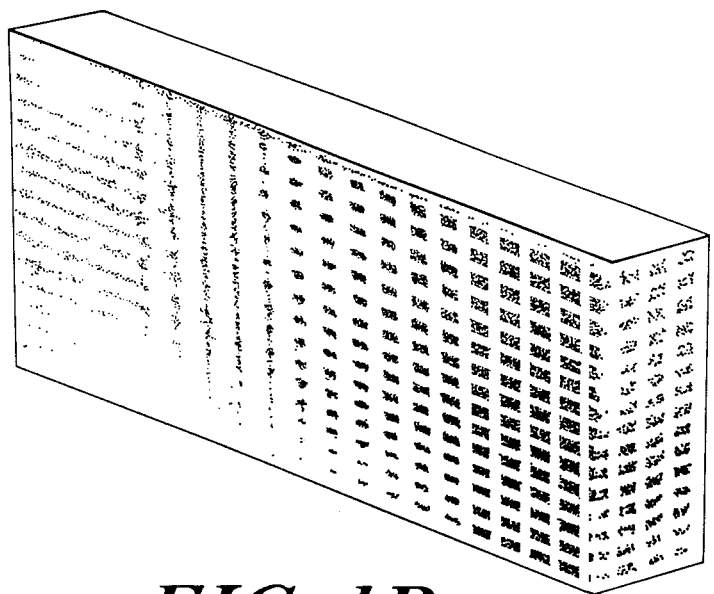
FIG. 1B is a photograph of the object of FIG. 1A, illustrating the blurring in orthogonal directions for that portion of the object furthest removed from the plane of est focus.

Referring to FIG. 1B, what is seen by camera 24 of FIG. 1A is in general the projected pattern on the object surface. The photograph shown in FIG. 1B has been taken from a position outside of the range camera. It will be appreciated, that this pattern, when viewed from the perspective of the range camera, does not suffer from the missing parts problem, as would be the case for structured light triangulation systems. Note, all parts of the scene that are seen by the camera, are also exposed to structured light.

Figure 1C:
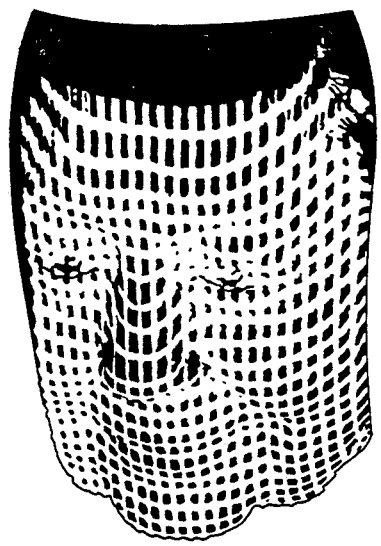
FIG. 1C is a photograph of a face of an individual onto which is projected the limited depth of field light pattern, illustrating blurring of the pattern on the individual's face for those features of the face which are further from the light source than the in focus nose.

Referring to FIG. 1C, a photograph illustrates how the same projected pattern appears on the face of an individual. This usage for the subject system is important in the area of security for recognition of facial features from electronically stored data taken from the subject range camera.

Figure 2:
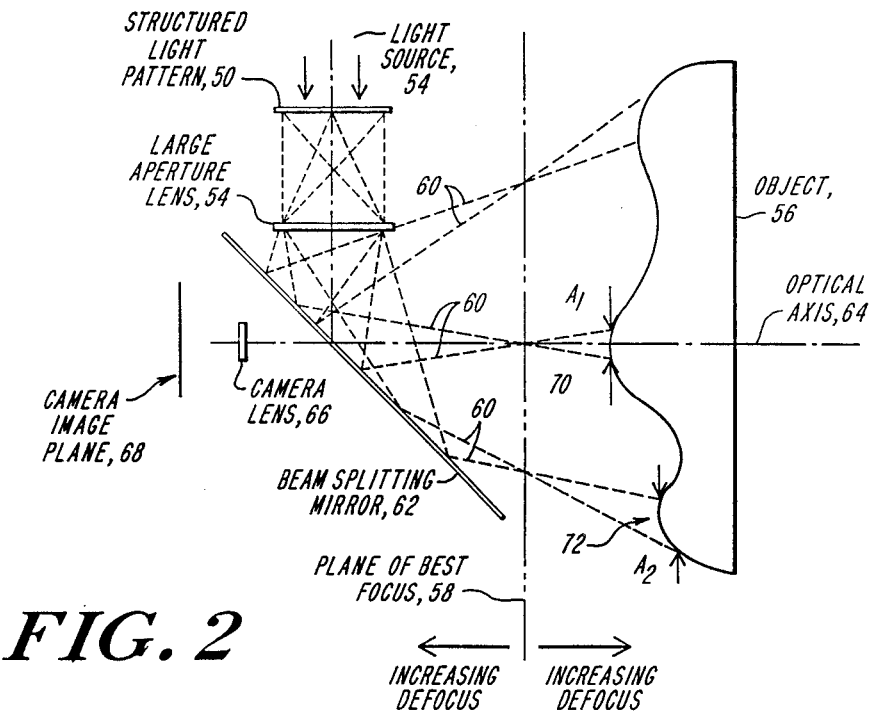
FIG. 2 is a diagrammatic illustration of the projection of the structured light pattern onto an object, illustrating the plane of best focus and illustrating increasing defocus to either side of this plane.

Referring to FIG. 2, it will be seen that the structured light pattern is formed through a transparent pattern 50 illuminated by a light source 52 which is focused by a large aperture lens 54 in the direction of object 56, such that the plane of best focus 58 is as illustrated where rays 60 cross. These rays emanate from various points on the structured light pattern, with the light from the source being redirected by a beam splitting mirror 62 which lies on an optical axis 64 that includes camera lens 66 and camera image plane 68. As can be seen, the distance of a surface patch on the object from image plane 68 is determined by the width, spread or blur 70 of the projected pattern on the surface patch. Thus for instance the projected pattern at area $A_1$ is defined by the illustrated blur or width. Alternatively, for a Portion of the object further removed from the plane of best focus illustrated by area $A_2$, the width of the projected pattern onto this area as indicated at 72 exceeds that associated with that illustrated at 70, thereby providing an indication that the $A_2$ portion of the object is further away than the $A_1$ portion.

Figure 3:
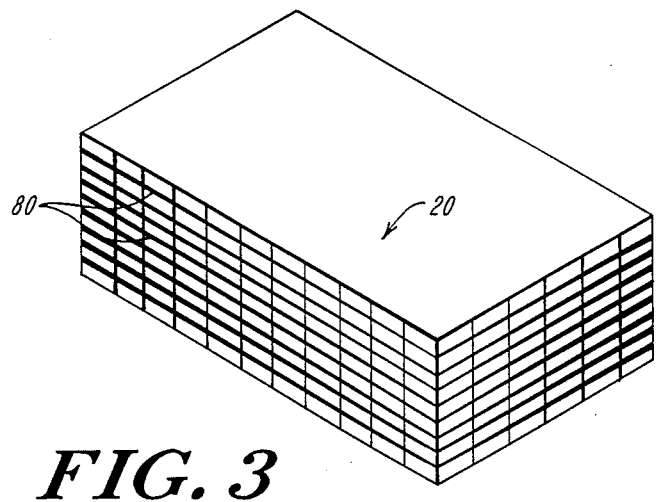
FIG. 3 is an isometric view of the object of FIG. 1A illustrating the blurring of the projected lines as the portion of the object recedes from the plane of best focus.

As illustrated in FIG. 3, object 20 of FIG. 1A is shown having been illuminated with the grid 16, with the horizontal lines 80 being illustrated in an increasingly blurred condition to the left of the plane of best focus, here illustrated by a dotted line 82. The same is true for the vertically running lines. For purposes of discussion, the horizontal lines are the ones used for determining distance or range.

Figure 4:
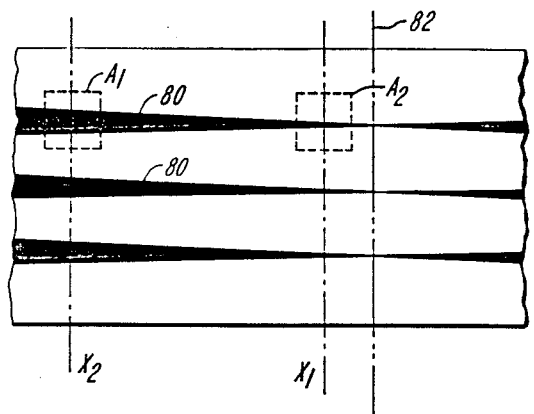
FIG. 4 is a diagrammatic illustration of portions of the horizontally running blurred lines of FIG. 3, illustrating detection of blurring at two areas on a single blurred line.

Referring to FIG. 4, diagrammatically it can be seen that the blurring of lines 80 along axes or slices $X_1$ and $X_2$ is quite different. The resulting amplitude versus position graph of FIG. 5 defines the blur or spread by lines 82 and 84 respectively for the $X_2$ slice and the $X_1$ slice. Having determined the blur associated with a surface patch, digital processing techniques are utilized to ascertain the extent of the blur. In one embodiment this is accomplished through the utilization of a standard deviation technique, although utilizing 3 dB down power points is equally acceptable in measuring the degree of blur. In FIG. 3 the right hand portion of object 20 is closest to the plane of best focus, whereas the left hand portion is removed from the plane of best focus. Scanning across the stored pattern of FIG. 3, one can derive the graphs of FIG. 5 for the indicated slices $X_1$ and $X_2$.

It will be appreciated that the periodicity of the pattern is important in determining how great a depth of field can be accommodated. It will also be appreciated that if the lines blur together, then it is much harder to obtain the requisite measurement. Note that line spacing is critical to the amount of depth that can be accommodated by the subject system.

Figure 5A:
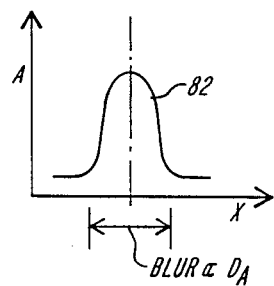
FIG. 5 is a set of graphs, illustrating the blur associated with the lines through indicated areas of FIG. 4.
Figure 5B:
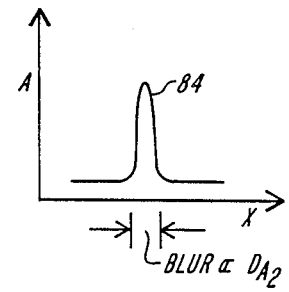

It can be readily seen from FIG. 5 that the amount of blur can be measured by considering the indicated waveforms. Because of the known geometry of the system, the center position of the waveform is also known. Note that this center position corresponds to the position of an unblurred line observed when the object surface is in the plane of best focus of the structured light source. Waveform minima along the slices indicated in FIG. 4 occur halfway between the center positions of the lines 80.

By calculating the standard deviation of the portion of the waveform between minima, an accurate measurement of the degree of blur can be obtained. The standard deviation corresponds to a range measurement for one surface patch.

In order to more accurately measure the degree of blur, one picks a particular slice. The centers of the periodically varying pattern are known from the range camera geometry. One then utilizes the halfway point between the adjacent center points to establish the boundaries for performing the standard deviation computation. In calculating a single standard deviation value, the data from the image is scanned on a line by line basis with all data points between adjacent halfway points being evaluated across a given blurred line. Through the utilization of the standard deviation technique, the degree of accuracy of the measurement of the blur is not limited by the resolution of the spatial grid which has been used to sample the image, i.e., the distance between adjacent picture elements. In fact, the amount of blur is usually determined many times more accurately than the distance between adjacent picture elements by combining many data points in the standard deviation measurement. The term "fractional-pel accuracy" will be used herein to refer to an accuracy that is higher than the distance between adjacent picture elements of the sampling grid of the image. The standard deviation is computed as follows:

$$\sigma^2 = \frac{\Sigma_y y^2 L(y) - (\Sigma_y y L(y))^2}{\Sigma_y L(y)} \qquad (2)$$

where y is the vertical position along a slice, and L(y) is the signal amplitude at position y. Summations are carried out over all picture elements along a slice that lie in between the delimiting half-way points explained above. The first term in the numerator of the standard deviation equation is the second order moment of the waveform with respect to the Point y=0. The second term in the numerator determines the center position of waveform with fractional-pel-accuracy. By subtracting the square of the center position from the second order moment, the second order central moment results, i.e., the second order moment with respect to the center position of the waveform. The denominator of the standard deviation equation (2) normalizes the resulting value by the total amount of light reflected from the slice or surface patch considered for the standard deviation measurement in order to compensate for the influence of reflected light intensity on the value of the second order central moment calculated in the numerator of the standard deviation equation. Note that the equation (2) computes the square of the standard deviation of the signal waveform. It will be appreciated that the standard deviation or spatial spread of a projected line thus measured is linearly related to the distance of the surface patch from the plane of best focus, as can be readily seen by considering a pair of rays 60 in FIG. 2.

For an accurate range measurement, the structured light signal L(y) used in the standard deviation equation should not contain components that are due to ambient illumination. In situations where the video signal contains ambient illumination components, these can be removed from the signal using a spatial high-pass filter that suppresses low-frequency amtient illumination components. Alternatively, the video signal amplitude can be considered at the half-way points that serve as delimiters for the standard deviation measurement. At these half-way points, the video signal is only due to amtient illumination. The ambient illumination component at all picture elements of the image can then be estimated by interpolating between the observed ambient illumination data points and successively subtracting them from the video signal to obtain a signal waveform L(y) that is only due to the structured light pattern for use in the standard deviation equation.

Figure 6:
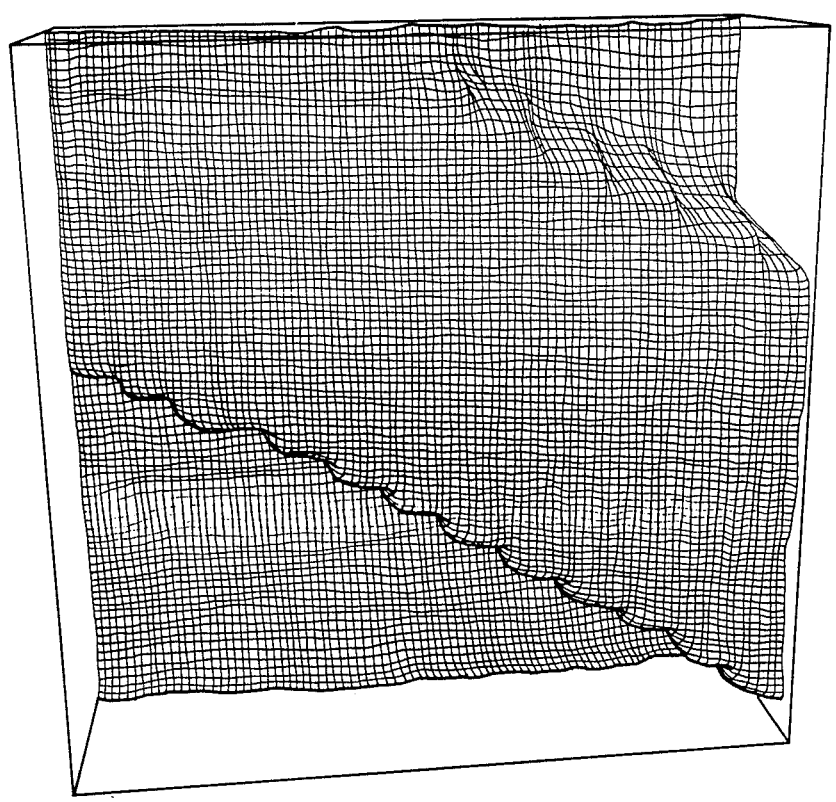
FIG. 6 is a photograph, illustrating the reconstructed range map derived from the object of FIG. 3.

Referring to FIG. 6, having determined the range or distance values, these can be displayed as the 3-D surface plot illustrated in FIG. 6 which gives a range map of the object. Such a display is useful in visualizing the image in terms of range or for inspection purposes.

Figure 7A:
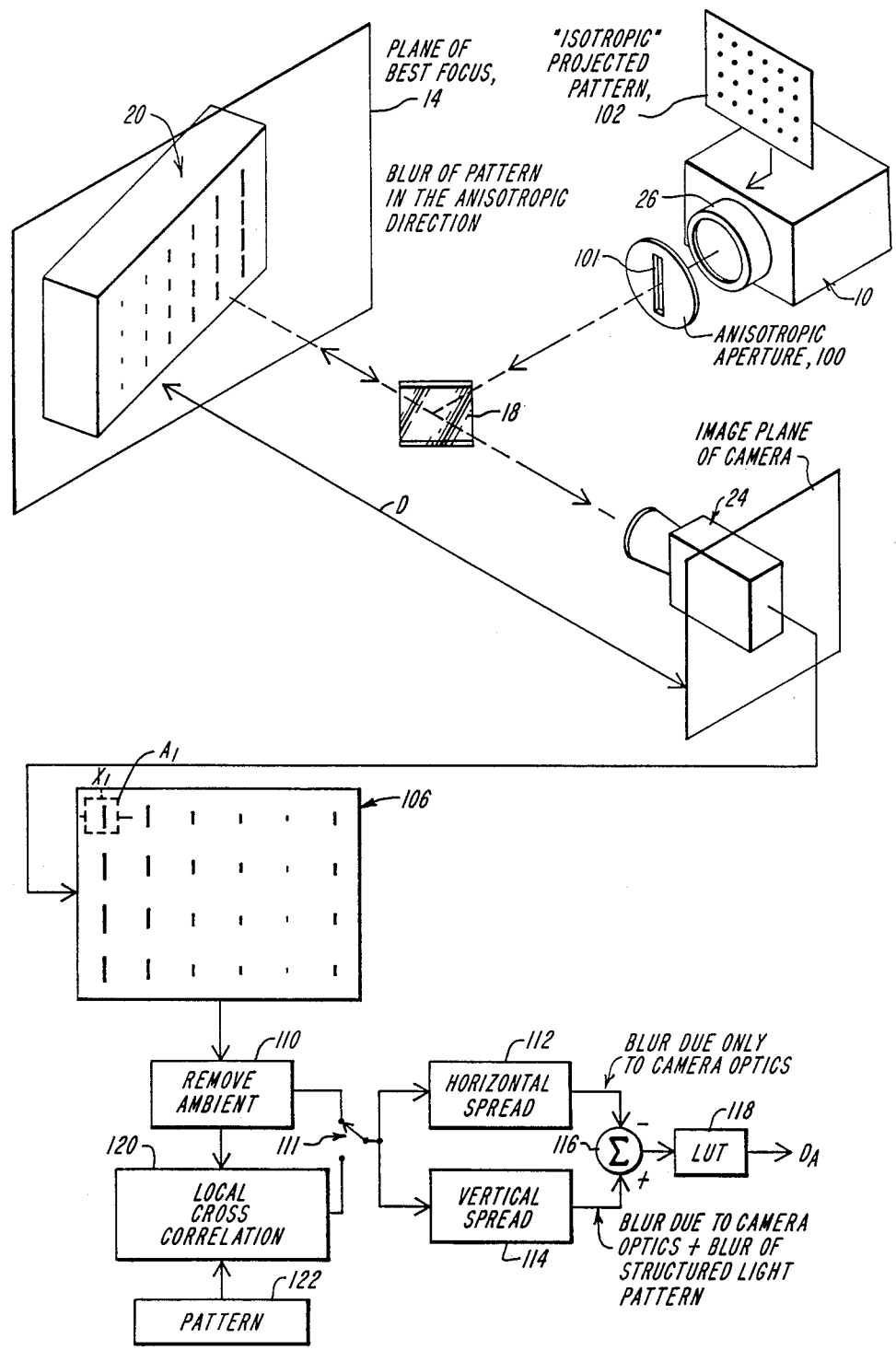
FIG. 7A is a diagrammatic illustration of the utilization of an anisotropic aperture to be able to eliminate systematic errors associated with the camera in the subject system through the utilization of an isotropic projected pattern.

Referring to FIG. 7A a system similar to that illustrated in FIG. 1A is shown in which projector 10 is provided with an anisotropic aperture 100 having a slit 101 in front of large aperture lens 26, with an isotropic projected pattern having impulses or dots illustrated by pattern 102. For purposes of this patent, an impulse refers to a two dimensional light pattern with all of its energy concentrated in one point. The pattern is redirected by beam splitter 18 onto object 20 which is behind the plane of best focus 14. Here it will be apparent that due to the anisotropy of the aperture, all blurring takes place in the long direction of the anisotropic aperture. Thus with respect to the range measurement, the measuring direction for blur corresponds to the long axis of the anisotropic aperture. The purpose of utilizing the anisotropic aperture is to permit measurement of the system error of camera 24. This error is either due to a variation in the position of the image plane 22 of the camera or due to other camera-induced errors. As mentioned hereinbefore, these errors are produced isotropically and their effect is identical in each of the orthogonal directions of interest here. The output of camera 24 can be seen at stored image 106. Assuming that one wishes to measure the blur at surface patch $A_1$, the stored image 106 is scanned through switch 111, with ambient illumination components removed at unit 110, if required. The same techniques described above in conjunction with a rectilinear grid structured light pattern can be employed in conjunction with the impulse structured light pattern to remove ambient illumination components. The vertical spread of the impulse contained in surface patch A1 and 106 is measured using the standard deviation measurement equation (2). Different from the algorithm for the rectilinear grid structured light pattern, however, the summations in equation (2)

are now carried out over all picture elements contained in the surface patch A1. The output of the unit 114 measuring vertical spread is the square of the vertical standard deviation, or vertical variance of the observed defocused impulse. In addition to the vertical variance, the horizontal variance of the same defocused impulse is measured at 112 using the same standard equation (2). Instead of the vertical position y associated with each picture element, the horizontal position x is used in (2) to obtain the horizontal variance. The horizontal variance is only due to systematic errors introduced by the limited depth of field of the camera and blurring introduced by the camera target. This systematic error can be eliminated by subtracting the horizontal variance from the vertical variance of the pattern through subtractor 116 in FIG. 7A. The output of subtractor 116 is fed through a look-up table 118 that serves to convert the corrected variance into a range value. The look-up table in general implements a square root nonlinearity and a scaling of its input, such that a range value in the desired units appears at its output. It will be appreciated that the look up table can additionally compensate for other systematic system errors due to lack of optical alignment if the look-up table is determined individually in a calibration procedure for each range camera built.

More particularly, the resultant spreads $6_x^2$ and $6_y^2$ are subtracted one from the other at 116, with the result being processed at look up table 118 that takes the square root of the corrected spread and scales it, with $6_{corrected} = \sqrt{6_y^2 - 6_x^2}$.

It is the purpose of these units 114 and 116 to provide a measure of the blur only in the indicated directions. When the outputs of these units are subtracted one from the other the result is a signal corrected for systematic error in that error due to horizontal error or camera-induced blur is subtracted out. Here, the blur in the horizontal channel, $6_{camera}^2$ is subtracted from the blur in the vertical channel, $6_{camera}^2 + 6_{pattern}^2$ to leave $6_{pattern}^2$. Thus camera-induced error is removed from the measurement. The output, $D_{A1}$, of LUT 118 is an indication of the distance or range of the surface patch $A_1$ from the image plane of the camera, with the error induced by camera optics removed.

Figure 7B:
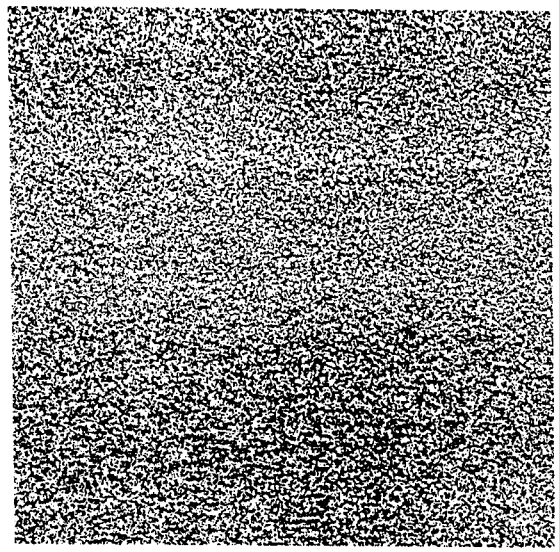
FIG. 7B is a photograph of a pseudo-random noise pattern for use in the system of FIG. 7A.

Sparse structured light patterns, such as lines, grids, or impulses, can lead to problems, since they do not sense range for all points in a scene. This can lead to spurious range measurements if the range changes rapidly between positions captured by the structured light pattern. In order to eliminate the problem associated with sparse structured light patterns, dense structured light patterns such as a pseudo-random noise pattern may be utilized as the isotropic structured light pattern 102. A pseudo-random noise pattern is produced by a pseudo-random number generator. Such a pseudo-random noise pattern is illustrated in FIG. 7B. It can be seen that the pseudo-random noise pattern can be considered "isotropic". The impulse response or point spread function of the system is derived through coupling the output of unit 110 to a local cross correlator 120 which correlates the signal with the pseudo-random noise or other pattern 122 projected onto the object.

The pseudo-random noise pattern has a "white noise" property, i.e., spatially adjacent samples of the pattern are uncorrelated. Using a structured light pattern with this property, the output of the cross correlator is simply the impulse response or point spread function of the system from the structured light source to the blurred structured light pattern 106. Once the impulse response or point spread function has been extracted from the blurred pseudo-random noise pattern by the cross correlator, the horizontal and vertical standard deviation measurement according to equation (2) can be applied to the impulse response as before in the case of the impulse structured light pattern; and range can be determined by the same process as shown in FIG. 7A. The pseudo-random noise pattern can be stored in any suitable storage device or can be developed on the fly by utilizing a binary shift register with feedback. A binary shift register of length N with appropriate feedback generates an uncorrelated pseudo-random sequence of zeroes and ones that repeats itself only after $2^{N+-1}$ generated numbers.

The result of utilizing the pseudo-random noise pattern is that any holes associated with sparse structured light patterns are eliminated, with the blur detection system being uniquely capable of providing an accurate indication of local blur or defocus due to the cross correlation process.

Figure 8:
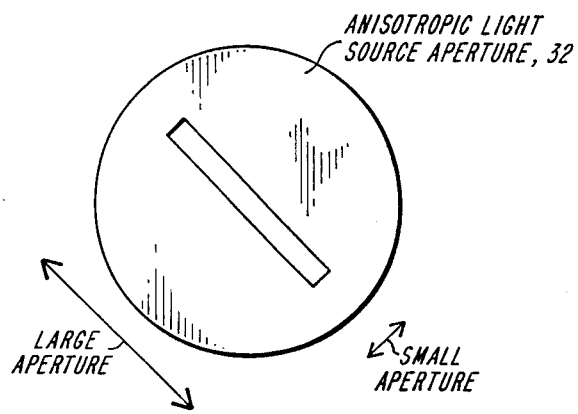
FIG. 8 is an illustration of an anisotropic light source aperture oriented at a 45 degree angle to the horizontal, illustrating the large aperture direction and the small aperture direction.

For CRT cameras the diagonally-oriented anisotropic aperture 132 of FIG. 8 can be used for the range measurement. The diagonal slit as shown in FIG. 8 in combination with an isotropic structured light pattern eliminates systematic errors introduced by CRT line scanning.

More particularly, in a cathode-ray camera tube, the electrical charge of the camera target is scanned line-by-line by an electron beam. This line-scanning process introduces an additional blur into the image 106 that is different along the scanning direction, which is usually horizontal, and orthogonal to the scanning direction. The blur introduced by the line-scanning, however, is equal in the two diagonal directions. Thus a comparison of the diagonal blur introduced by the small aperture and the large aperture in the diagonal directions of aperture 132 can be used to compensate for systematic errors in the system without bias.

Figure 9:
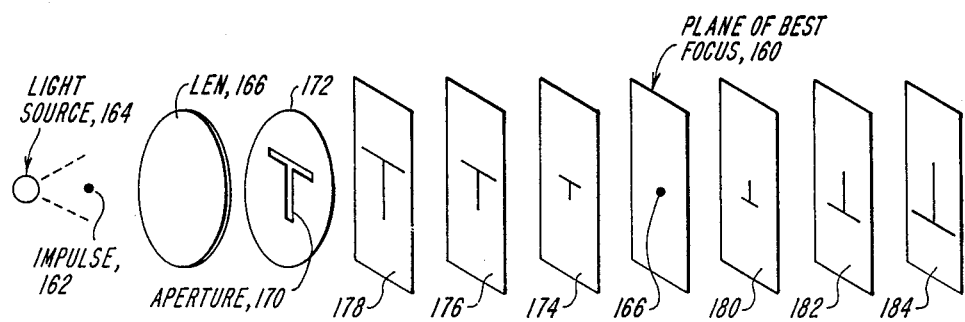
FIG. 9 is a diagrammatic illustration of a system for determining direction of blur using an anisotropic non-point symmetric aperture.

Referring now to FIG. 9, assuming a system in which the plane of best focus is illustrated at 160, assuming also a single impulse as illustrated at 162 between the light source 164 and a lens 166, this impulse at the plane of best focus would appear as illustrated at 166. With an isotropic aperture utilized in the system, this projected impulse would blur out when the object onto which it is projected moves to either side of the plane of best focus. It would therefore be impossible without the utilization of a non-point symmetric anisotropic aperture 170 to determine whether the object on which the impulse is projected is in front of or behind the plane of best focus. This provides an ambiguity which limits the range over which the system is operative.

As illustrated in FIG. 9, an apertured mask 172 having the non-point symmetric anisotropic slotted aperture 170 is placed at lens 166 with the result that the blur produced on the object, when viewed at planes 174, 176, and 178 between the plane of best focus and the light source, results in a blurred pattern which corresponds to the shape and orientation of the non-point symmetric slotted mask. However, as illustrated at planes 180, 182, and 184 the blur pattern on an object is inverted. It can therefore be seen that the use of an anisotropic non-point symmetric aperture permits ready analysis of the blurred pattern, with the object being to ascertain whether the blur is in one direction or the other vis-a-vis, the plane of best focus.

Figure 10:
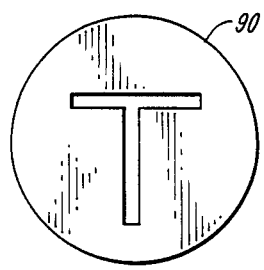
FIG. 10 is a diagrammatic illustration of an anisotropic light source, having no point symmetry for use in determining the direction of blur for the system of FIG. 7.
Figure 11:
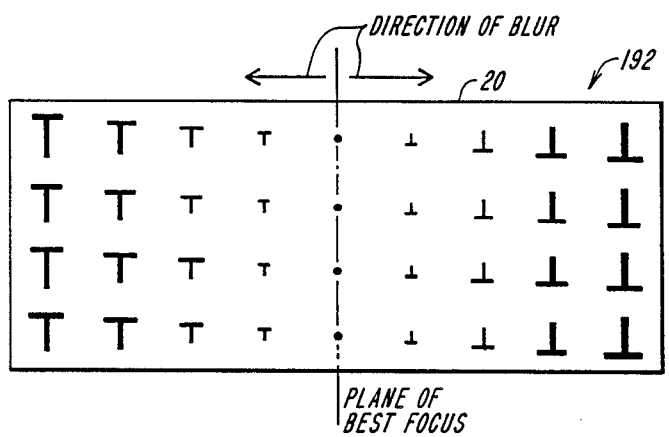
FIG. 11 is a diagrammatic illustration of the image of the pattern produced by an isotropic structured light pattern when projected through the anisotropic aperture of FIG. 10, illustrating the direction of blur in terms of the orientation of the projected structured light pattern; and, FIG. 12 is a diagrammatic illustration of the use of an astigmatic lens to provide two distinct planes of best focus in orthogonal directions for a structured light pattern, thereby to permit not only systematic error removal but also to be able to ascertain the direction of blur.

Referring to FIG. 10, the anisotropic aperture, here illustrated at 190 may be in the form of a "T". This can be accomplished by placing a "T" slotted mask in front of the projector lens. As can be seen in FIG. 11, utilizing this type of aperture in front of an impulse or point grid having a regular isotropic pattern produces a pattern 192 on an object 20 here shown evenly displaced fore and aft of the plane of best focus 154. Note, the direction of defocus can be ascertained immediately by the orientation of the blurred image pattern. It can be seen that to the left of the plane of best focus are images of the "T" in its normal uninverted configuration. On the other hand, to the right of this diagram, it can be seen that the "T" image is inverted for portions of the pattern projected onto an object which is further away from the plane of best focus. It will be appreciated that pattern recognition techniques can be utilized with this type of anisotropic aperture to ascertain whether the object is fore or aft of the plane of best focus. Among the pattern recognition techniques are those involving matched filtering or pattern matching. Note, apertures having R, C, V, α etc. configurations can be used.

With slit-apertures or T-shaped apertures it might be difficult to project enough structured light on the object surface. A very attractive alternative is the use of astigmatic optics in the light source. Considering the combination of a spherical lens of focal length $f_0$ combined with a cylindrical lens of focal length $f_{cyl}$, for structured light that is oriented strictly parallel to the axis of the cylindrical lens, only the spherical lens has to be considered, and it is $$\frac{1}{f_0} = \frac{1}{u} + \frac{1}{v_1} \quad (3)$$

where u is the distance between the lens and the image plane of the structured light source, and $v_1$ is the distance between lens and plane of best focus for this particular orientation. For horizontal structures, one has to take into account the curvature of the cylindrical lens, and the plane of best focus changes by distance $v_2$, according to $$\frac{1}{f_0} + \frac{1}{f_{cyl}} = \frac{1}{u} + \frac{1}{v_2} \quad (4)$$

Thus, one has two planes of best focus for two orthogonal directions of structured light. Similar to the slit aperture, one can compare the blur in these orthogonal directions and infer range. The utilization of two planes of best focus also removes the ambiguity of whether an object is behind or in front of a particular plane of best focus.

Figure 12:
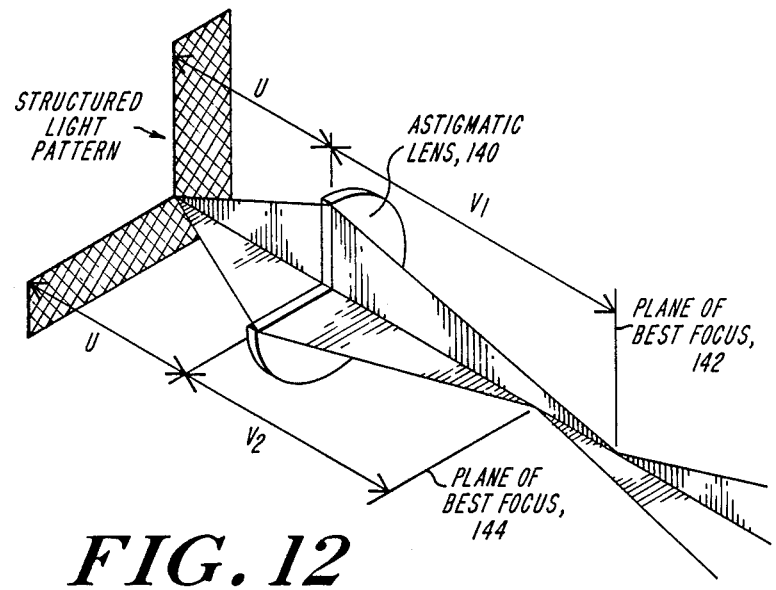

As illustrated in FIG. 12, the spherical lens and the cylindrical lens can be combined into a single astigmatic lens. Here with an astigmatic lens 140 utilized in place of the anisotropic aperture 132, the plane of best focus for vertical blur is at a position 142, whereas the plane of best focus for horizontal blurring occurs at a different position 144. By having two distinct planes of best focus in orthogonal directions, one can ascertain whether the object is in front of or behind either of the planes of best focus.

This is because the blur in vertical direction measures the absolute distance from the plane of the best focus for vertical structures, while the blur in horizontal direction measures the absolute distance from the plane of best focus for horizontal structures. Each of the horizontal and vertical blur measurements gives two possible range results consistent with the observed blur, but only one out of each pair will be close to one of the two results obtained from the blur in the orthogonal direction. A combination of the two close results, for example a weighted average, is the final estimated range.

In summary, in one embodiment a slide projector, a CCD camera, and a beam splitter are used. As a structured light pattern, one can use evenly spaced vertical and horizontal lines. Using such a grid, it will be noted that the spread of each of the defocused lines is directly proportional to distance from the plane of best focus. Since the defocused lines do not overlap and their position is known a priori, it is without difficulty that one can measure their spread with an image processing technique for each position along each horizontal stripe. Then one can calculate its standard deviation or spatial spread according to equation (2). If the video signal contains a component due to ambient light, this component can be subtracted out before calculating the standard deviation. One can estimate the ambient component from the luminance signal between the defocused lines or simply eliminate it by high-pass filtering. Note that range or distance is picked up surprisingly well considering how simple the technique is.

In one embodiment, the range-from-defocus camera can discriminate more than 60 range or distance values, giving about 6 bits of range data. The spatial resolution of the range or distance map may however be severely limited as a result of the structured light pattern used. In one experiment, the entire scene was scanned by only 23 vertical lines. This sparse sampling leads to aliasing effects in the form of ragged edges. However dense structured light patterns can be used, such as pseudo-random noise, to avoid sampling effects and obtain a higher spatial resolution of the range or distance map.

As to systematic errors, the structured light pattern appears additionally defocused due to the limited depth-of-field of the camera. Further blurring is introduced by the camera sensor itself. These sources of systematic error are roughly isotropic. In order to make the system insensitive to these errors, one can use an isotropic structured light pattern in conjunction with an anisotropic light source aperture. The vertical slit is an example of a simple anisotropic aperture. If the object surface is not in the plane of best focus, the structured light pattern is blurred in the vertical direction, but only slightly in the horizontal direction. In order to measure range, signal processing following the camera compares blur in these two orthogonal directions. Since blur by the camera optics affects vertical and horizontal structures equally, one can substantially eliminate camera-induced blur from the range measurement.

If the camera uses a CRT, line-scanning can affect the horizontal and the vertical direction differently. In this situation, it is advisable to turn the slit aperture by 45 degrees and compare blur in two diagonal directions.

Note, the structured light pattern in one embodiment consists of a series of impulses, so one can see the impulse response of the system directly in terms of blurring along the vertical direction. Of course, impulses would introduce the same problems associated with sparse sampling, and for a practical system dense pseudo-random noise is a better structured light pattern.

Moreover, objects in front of the plane of best focus and behind the plane of best focus both appear blurred. This ambiguity is a disadvantage that both active and passive depth from defocus share. As a practical remedy, the plane of best focus can either be set closer than the closest point in the scene, or further than the furthest point. If infinity is chosen to be in focus, ambiguity is avoided altogether. However, the highest sensitivity of the sensor might not coincide with the most interesting distance measurement range. As previously mentioned, this ambiguity can be removed if the proper combination of light pattern and aperture shape is used. By using an aperture that is not point-symmetric the useful measurement range of the system can be approximately doubled. In another embodiment, an astigmatic lens is used in the structured light source which leads to two planes of best focus for permitting unambiguous range determinations absent the aforementioned problem with direction of blur. As mentioned, it is easier to transmit larger amounts of light through astigmatic optics than through slit apertures.

Having above indicated a preferred embodiment of the present invention, it will occur to those skilled in the art that modifications and alternatives can be practiced within the spirit of the invention. It is accordingly intended to define the scope of the invention only as indicated in the following claims:

We claim:

1. A range determining system, comprising:
    means for optically projecting a limited depth of field pattern of light and dark areas having high spatial frequency onto an object for permitting determination of the range of surface patches on said object from a predetermined plane, with said pattern being focused to a plane of best focus; and,
    means for determining the range of a surface patch on said object from said plane of best focus by measuring the degree of blur of said pattern on said object at said surface patch, said projecting means including optics having a lens with a non-point symmetric anisotropic aperture, thereby to project a distinctive pattern onto said object, the orientation of said distinctive pattern providing an indication of whether said surface patch is in front of or behind said plane of best focus.

2. The system of claim 1 and further including means for determining the orientation of the pattern projected by said non-point symmetric anisotropic aperture.

3. The system of claim 1 wherein said aperture is in the form of an alpha/numeric character.

4. The system of claim 1 wherein said aperture is in the form of a regular geometric figure.

5. The system of claim 4 wherein said regular geometric figure is a triangle.

6. The system of claim 1 wherein said aperture is in the form of a "T".

7. The system of claim 1 wherein said aperture includes an apertured mask.

8. The system of claim 7 wherein said aperture includes a lens and wherein said mask is adjacent said lens.

* * * * *